(12) United States Patent
Li

(10) Patent No.: US 8,919,188 B2
(45) Date of Patent: *Dec. 30, 2014

(54) EXTERNAL TIRE PRESSURE SENSING DEVICE

(75) Inventor: Zhitao Li, Zhongshan (CN)

(73) Assignee: Steelmate Co., Ltd (CN)

( * ) Notice: Subject to any disclaimer, the term of this patent is extended or adjusted under 35 U.S.C. 154(b) by 120 days.

This patent is subject to a terminal disclaimer.

(21) Appl. No.: 13/640,205

(22) PCT Filed: Nov. 15, 2011

(86) PCT No.: PCT/CN2011/082239
§ 371 (c)(1),
(2), (4) Date: Oct. 9, 2012

(87) PCT Pub. No.: WO2013/037164
PCT Pub. Date: Mar. 21, 2013

(65) Prior Publication Data
US 2013/0213126 A1  Aug. 22, 2013

(30) Foreign Application Priority Data

Sep. 13, 2011 (CN) .......................... 2011 1 0269771

(51) Int. Cl.
*G01M 17/02* (2006.01)
*B60C 23/04* (2006.01)
*B60C 23/02* (2006.01)
*G01L 17/00* (2006.01)

(52) U.S. Cl.
CPC ................. *B60C 23/04* (2013.01); *B60C 23/02* (2013.01); *G01L 17/00* (2013.01); *B60C 23/0408* (2013.01); *B60C 23/0444* (2013.01); *B60C 23/0496* (2013.01)
USPC .......................................................... 73/146

(58) Field of Classification Search
USPC ................................................. 73/146–146.8
See application file for complete search history.

(56) References Cited

U.S. PATENT DOCUMENTS

| | | | |
|---|---|---|---|
| 6,993,962 B1 * | 2/2006 | Ko | 73/146.5 |
| 2002/0166370 A1 * | 11/2002 | Chen | 73/146 |
| 2007/0193349 A1 * | 8/2007 | Petrucelli | 73/146.8 |
| 2010/0141417 A1 * | 6/2010 | Boes | 340/447 |
| 2013/0061667 A1 * | 3/2013 | Li | 73/146.8 |

* cited by examiner

*Primary Examiner* — Andre Allen
(74) *Attorney, Agent, or Firm* — Lerner, David, Littenberg, Krumholz & Mentlik, LLP

(57) ABSTRACT

An external tire pressure sensing device includes from bottom to top along it axial direction a base, a sensor for detection of the internal pressure of tire, a circuit board for incorporating a control circuit therein, a button battery and a packaging suite. The base includes a screw hole along its axial direction for locking with a gas nozzle, and a circular platform is formed on a top portion of the base; the device comprises an integral sealable venting member having a supporting platform tightly engaged with the circular platform, a communication portion placed into the base screw hole from the bottom of the supporting platform to push out a gas outlet valve of the gas nozzle, and a communicating hole for communicating the screw hole with an upper space of the supporting platform; the sensor is installed on the bottom surface of the circuit board so as to be electrically connected with a control circuit of the circuit board; and a sensing portion located on a bottom surface of the sensor is engaged tightly with the communicating hole of the sealable venting member; the button battery is positioned on a top surface of the circuit board and electrically connected with the control circuit so as to provide electrical power.

11 Claims, 4 Drawing Sheets

EXTERNAL TIRE PRESSURE SENSING DEVICE

CROSS-REFERENCE TO RELATED APPLICATIONS

The present application is a national phase entry under 35 U.S.C. §371 of International Application No. PCT/CN2011/082239 filed Nov. 15, 2011, which claims priority from Chinese Patent Application No. 201110269771.7 filed Sep. 13, 2011, all of which are incorporated herein by reference.

FIELD OF THE INVENTION

The invention relates to a device for sensing the automobile tire pressure and more particularly, relates to an external tire pressure sensing device.

BACKGROUND OF THE INVENTION

From kinds of :patent databases throughout the world, many patent documents related to automobile tire pressure sensing device can be searched out. The technical solutions disclosed in these patent documents may differ from one another. The sensing devices manufactured according to these technical solutions however, suffer from the problem such as big size of the sensing device in particular big size of the sensing device in radial direction due to connection among various components and limitation of the nature of the components. Consequently these sensing devices fail to have their application in all kinds of automobile. As a result, a prior art external tire pressure sensing device is mounted generally onto the tire with big size (for example the tire of a truck). Iii case that the sensing device is installed into a small-sized car, the sensing device will look big in size. Specifically, the dimension of the sensing device will beyond the distance between the gas nozzle shaft and the outermost rim of the hub of the car. In this case, the sensing device will be exposed out of the outermost plane of the tire, and is susceptible to collision damage caused by obstacle or person, thus resulting in malfunction of the sensing device.

The undue big dimension of the sensing device may be resulted from axial dimension and radial dimension of the sensing device. it is because normally the gas nozzle is angled with respect to the outer side surface. of the tire and correspondingly, the sensing device installed on the gas nozzle is also angled outwardly In this case, the axial height and radius of the sensing device itself together determine the offset distance of the sensing device from the plane defined at the outermost side of the tire. Apparently, the size of the sensing device may be reduced either by reduction of the radial size or by reduction of the height of the sensing device. To this end, the internal construction of the entire sensing device should be optimized. By now, all prior art technology fail to realize this object, as it is not easy to arrange many components and electrical elements inside extremely limited internal space of the sensing device.

A typical external tire pressure detection transmitter is disclosed in Chinese Patent No. 2826556. The transmitter contain complex components such as the printed circuit board disposed on the upper portion of a button battery for mounting an antenna thereon, the circuit board disposed on the lower portion of the button battery, and the gas-conducting construction constituted by multiple complicated and separate components. This of course increases the axial height of the transmitter. In addition, kinds of wire conduits for realizing electrical connection among the components arranged axially also necessarily increase the radial dimension of the transmitter. Clearly, the external tire pressure detection transmitter made according to the above technology is large in size and can only find its application in large-sized truck tire. Though it can also be mounted in a normal car, it will be susceptible to damage problems discussed above, Other patent documents searched out by the inventor also suffer from the same problem.

It is apparent from the above analysis that conventional physical construction doesn't work to significantly reduce the size of the external tire pressure sending device, thus failing to be mounted into tire of all kinds of automobile. Comprehensive optimization of the physical construction may work to address the above problem.

SUMMARY OF THE INVENTION

One object of the invention is to provide a compact, small external tire pressure sensing device suitable for all kinds of automobile tire.

To achieve the above object, the following technical solution is provided.

The external tire pressure sensing device of the present invention includes from bottom to top along its axial direction a base, a sensor for detection of the internal pressure of tire, a circuit board for incorporating a control circuit therein, a button battery and a packaging suite used for package purpose.

The base includes a screw hole along its axial direction for locking with a gas nozzle, and a circular platform is formed on a top portion of the base.

The device includes an integral sealable venting member. The sealable venting member has a supporting platform tightly engaged with the circular platform, a communication portion placed into the base screw hole from the bottom of the supporting platform to push out a gas outlet valve of the gas nozzle, and a communicating hole for communicating the screw hole with an upper space of the supporting platform.

The sensor is installed on the bottom surface of the circuit board so as to be electrically connected with a control circuit of the circuit board. A sensing portion located on the bottom surface of the sensor is engaged tightly with the communicating hole of the sealable venting member.

The button battery is positioned on a top surface of the circuit board and electrically connected with the control circuit so as to provide electrical power.

The control circuit is used to transmit via an antenna the signal generated by the sensor during detection process.

The packaging suite includes an inner suite sleeved on the periphery of the base and an outer suite which cooperates with the inner suite so as to pack the entire device.

The inner suite is provided with a frame disposed on a top surface of the circular platform of the base, the frame surrounding the periphery of the supporting platform of the sealable venting member.

A plurality of threaded posts is provided on the circular platform of the base; and a plurality of screws passes through corresponding through holes predefined in the circuit board and then is locked with corresponding threaded post.

The antenna includes one of the screws, a threaded post engaged with the above screw, a base secured with the post, and a gas nozzle contacting with the base. A micro-strip line is arranged on the circuit board and connected with both of the control circuit and antenna.

A stepped ring is provided on the circular platform of the base at location corresponding to the screw hole of the base; the inner diameter of the stepped ring is smaller than that of the screw hole; a circular notch is defined between the communication portion of the sealable venting member and supporting platform; and the stepped ring is disposed into the circular notch so as to securely connect the sealable venting member and base.

A circular groove is defined in an outer wall of the inner suite; a rubber ring is received inside the circular groove; and the outer suite and inner suite are secured with each other and engaged with each other through the rubber ring.

A plurality of radial screw holes is defined in a bottom portion of the outer suite; corresponding number of screws pass radially through respective screw holes; and an end surface of each screw is pressed against the bottom surface of the inner suite.

An extension cylinder is provided on the bottom portion of the base; a plurality of radial screw holes is defined in a circumferential wall of the extension cylinder; and a number of screws pass through respective radial screw holes and then are locked with a circumferential wall of the gas nozzle.

The outer diameter of the outer suite is no more than 2.32 cm; and the axial height from the circular platform of the base to the outer suite is no more than 1.1 cm.

To further reduce radial dimension of the outer suite, the outer suite is of a conical shape.

Compared with prior art, the invention has the following advantages.

The relative location among the components of the external tire pressure sensing device of the invention is compact and reasonable. As such, the radial dimension of the finally assembled device is limited to 2.32 cm or less. In addition, the axial distance between the bottom surface of the circular platform of the base and outer suite is no more than 1.1 cm. Accordingly, the entire product is compact and more reliable in structure, and may be applied to tire of almost any kind of automobile. After the sensing device of the invention is installed onto the gas nozzle of these kinds of automobile, the entire product has very small size. The sensing device will not be exposed out of the outermost plane of the tire, thus effectively protecting the sensing device.

The integral sealable venting member of the invention has many functions. For example, it can push out the gas outlet Val v e of the gas nozzle, realize venting purpose, seal the entire gas nozzle by engagement between the circular notch and stepped ring of the base, and seal the entire sensor by its supporting platform. The venting member has man functions and is easy to be manufactured. As the venting member is an integral component, and the circular notch is defined between the communication portion and supporting platform, the engagement between the circular notch and stepped ring of the base makes it possible to significantly reduce the axial height of the whole venting member, thus the axial height of the entire product being reduced as well. Comparatively, prior art construction has greatly increased axial height because that the communication portion, base and supporting platform are separate components and the relative location a :wig them must be maintained reliably.

The antenna construction of the invention is constituted by metal part such as the screws, threaded post, base and gas nozzle. In addition a micro-strip line serving to match impedance and extend the length is provided on the circuit board. The signal strength of the antenna is enhanced and no dedicated antenna is required, thereby effectively reducing the interior space of the sensing device.

The entire product is packaged by engagement of the outer and inner suites. Plural screw holes are defined in the bottom portion of the outer suite, plural screws pass through these screw holes respectively and finally are pressed against the bottom surface of the inner suite by the end surfaces of these screws. This makes it unnecessary to form holes in the inner suite. The packaging space formed by the outer and inner suites can be used to largest extent. There is no concern regarding the packaging space being occupied by the screws. Moreover, the above screws also limit the location and are theft proof, thus preventing separation of the inner suite and outer suite and preventing theft of the packaging suite. Additionally, a rubber ring for increasing friction is disposed between the outer suite and inner suite, thus further preventing separation of the outer and inner suites.

In addition to threading engagement by which the sensing device of the invention is secured to the gas nozzle, other methods may be used to achieve the same purpose. For example, a screw may pass through the extension cylinder and then be locked with the circumferential wall of the gas nozzle, thus making the gas nozzle be further placed at location.

Therefore, the connection between the sensing device and gas nozzle is more reliable, and this connection will not be influenced by rotation and sway of the tire.

DETAILED DESCRIPTION OF THE INVENTION

Various embodiments of the invention will be described below in further detail with reference to the accompanying drawings.

Figure 1:
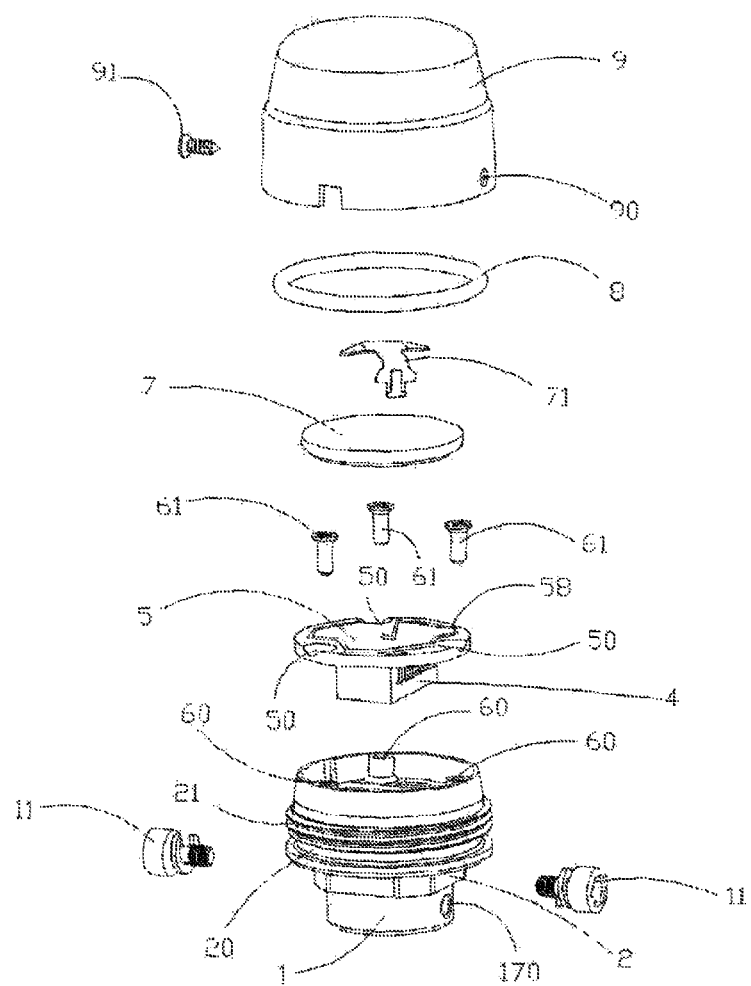
FIG. 1 shows an exploded perspective view of an external tire pressure sensing device according to a preferred embodiment of the present invention.

Reference is made to FIG. 1. According to one preferred embodiment of the invention, a tire pressure sensing device includes from bottom to top a base 1, an inner suite 2, a sensor 4, a circuit hoard 5, a button battery 7 and an outer suite 9. The inner suite 2 is sleeved on the periphery of the base 1, and the inner suite 2 is secured with the outer suite 9 so as to form a packaging suite. The inner space defined inside the packaging suite is used to accommodate the rest of the above-mentioned components. To reduce the diameter of the outer suite 9 to the largest extent, the outer suite 9 is designed to have a conical shape such that the outer suite 9 has a bottom portion of larger diameter and a top portion of a smaller diameter. Due to the smaller diameter of the top portion, the dimension of the entire outer suite 9 is reduced. There are some cooperative components such as a plurality of screws 61, threaded posts 60, a rubber ring 8 and a battery pressing tab 71 all of which will be described later.

Figure 2:
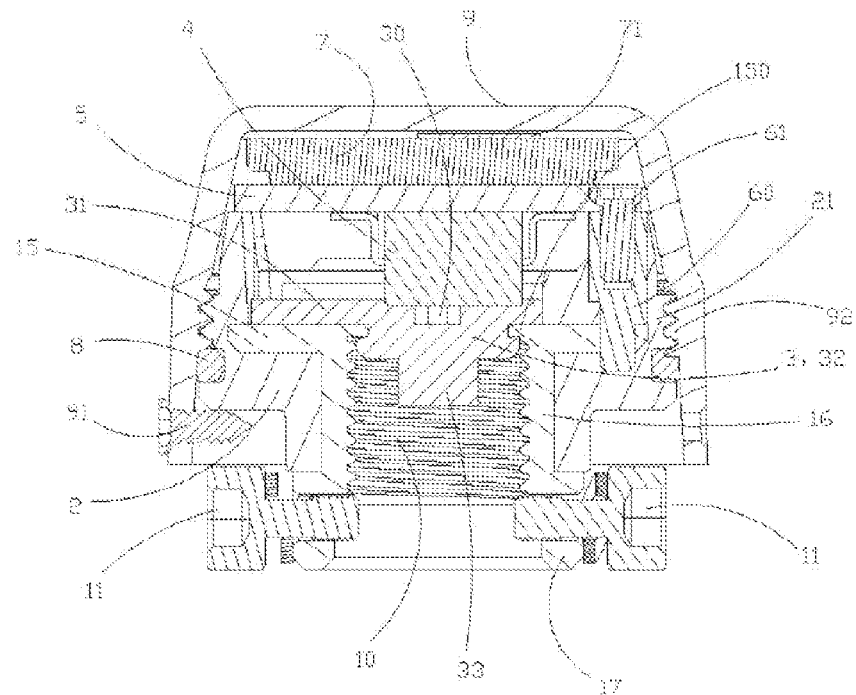
FIG. 2 shows an assembled and cross-sectional view of the external tire pressure sensing device according to a preferred embodiment of the present invention
Figure 3:
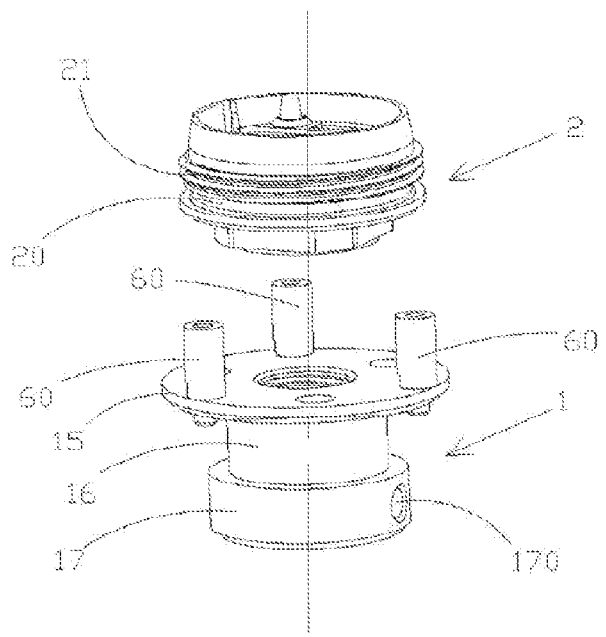
FIG. 3 shows assembling relationship among a threaded post, an inner suite and a base shown in FIG. 1.

Referring to FIGS. 1-3, the base 1 includes a cylindrical main body 16 within which a screw hole 10 is defined, an extension cylinder 17 extended from the bottom of the main body 16, and a circular platform 15 disposed on the top of the main body 16. The circular platform 15 has a larger diameter than the main body 16 so as to support other components located on the platform 15. Three locating holes are defined evenly circumferentially in the circular platform 15 in order to locate (or lock) the above-mentioned three threaded posts 60. The screw hole 10 of the main body 16 extends through the top surface of the circular platform 15. The central portion of the platform 1 communicates with the screw hole 10. In addition, the inner diameter of the platform 15 is smaller than that of the screw hole 10 so that a stepped ring 150 is defined on the top portion of the screw hole 10 by the circular platform 15. The extension cylinder 17 is hollow and is extended upon the bottom of the main body 16. A pair of screw holes 170 is defined radially in a circumferential wall of the extension cylinder 17. When the gas nozzle passes across the extension cylinder 17 and is secured with the screw hole 10 of the main body 16, two screws 11 may pass through the pair of screw holes 170 of the cylinder 17 and therefore be rigidly secured on the circumferential wall of the gas nozzle, thus enhancing connection between the base 1 and gas nozzle. The circular platform 15, main body 16 and extension cylinder 17 of the base 1 are formed integrally.

Figure 4:
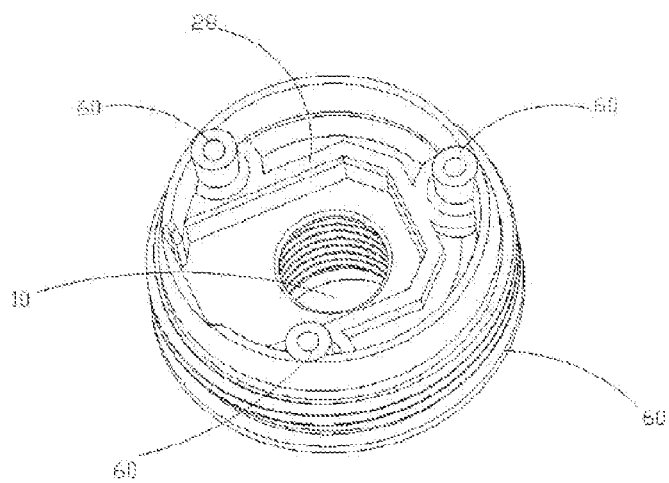
FIG. 4 shows a top perspective view of the construction shown in FIG. 3.

Reference is made to FIGS. 2 and 3. The inner suite 2. is made of rubber and is used to receive the main body 16 and circular platform 15 of the base 1 therein. Reference is also made to FIG. 4. On the top surface of the circular platform 15, a frame 28 of the inner suite 2, which is used to surround and locate the supporting platform of the sealable venting member, is formed. The frame 28 is pressed tightly against the top surface of the circular platform 15. A thread 21 is formed on an outer wall of the inner suite 2 so as to engage the thread 92 defined on an inner wall of the outer suite 9. The inner suite 2 includes a circular groove 20 defined on the bottom end of the thread 21 for receiving said rubber ring 8. Referring to FIG. 4, plural through holes are defined in the inner suite 2 through which the threaded posts 60 may pass. After the inner suite 2 is secured with both of the base I and threaded posts 60 disposed on the base I. the sealable venting member of the gas sensing device of the invention may be installed therein.

Figure 5:
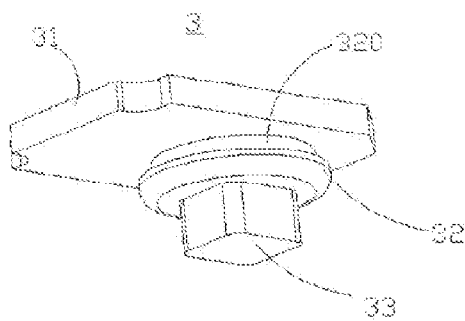
FIG. 5 shows a perspective view of a sealable venting member of the external tire pressure sensing device according to a preferred embodiment of the present invention.
Figure 6:
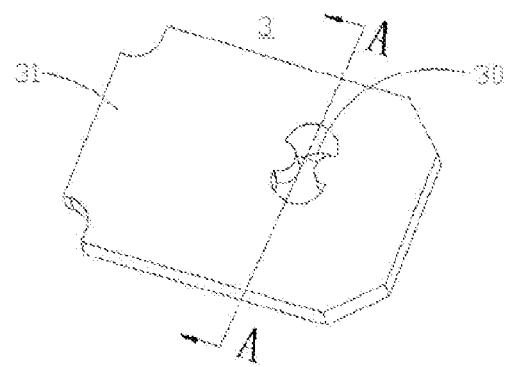
FIG. 6 shows another perspective view of a sealable venting member of the external tire pressure sensing device according to a preferred embodiment of the present invention.
Figure 7:
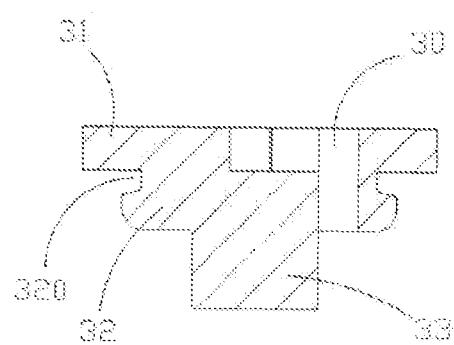
FIG. 7 shows a cross sectional view along A-A line of FIG. 6.

Referring to FIGS. 2, 5 and 7, the sealable venting member 3 of the sensing device of the invention is an integral component, and includes a plate-shaped supporting platform 31 located on the top of the venting member 3 and a communication portion 33 located on the bottom thereof for pushing out the gas outlet valve of the gas nozzle. A transition portion 32 is defined between the supporting platform 31 and communication portion 33. The transition portion 32 is of a cylindrical shape, and a circular notch 320 is defined in the circumferential wall of the transition portion 32. The dimension of the notch 320 is commensurate with that of the stepped ring 150 of the circular platform 15 of the base I such that the communication portion 33 of the sealable venting member 3 can be inserted into the screw hole 10 of the base 1, thereby realizing tight engagement between the member 3 and base 1 via the tight engagement between the stepped ring 150 of the based and circular notch 320 of the transition portion 32. This ensures that gas flow will not escape from the interface between the stepped ring 150 of the circular platform 15 of the base 1 and transition portion 32 of the venting member 3, thus achieving highly sealing effects. To make sure that the gas pressure inside the tire can be measured by the sensor 4 after the gas outlet valve of the gas nozzle is lifted up by the transition portion 32 of the sealable venting member 3, a communication hole 30 is defined in the sealable venting member 3 at a location biased from the axis of the sensor of the invention. Specifically, as shown in FIG. 7, the communication hole 30 passes through the transition portion 32 and supporting platform 31, thus the gas flow being able to travel across the screw hole of the base 1 and space defined at the top portion of the supporting platform 31 the communication hole 30 is designed to have a shape at the top surface of the supporting platform 31 corresponding to that of a sensing portion of the sensor 4 with the purposes of prevention of gas from escaping, thus not influencing the measurement precision. By the same token, the top surface of the supporting platform 31 is flat so as to engage with the entire bottom surface of the sensor 4 for preventing gas escaping. As the sealable venting member 3 is of integral part and tightly engaged with the base 1, the axial height of the member 3 is significantly low, thus reducing the axial height of the entire sensing device.

Referring to FIGS. 1 and 2, three through holes 50 corresponding to three threaded posts 60, are defined in the circuit board 5. Three screws 61 pass through these holes 50 and then are locked with the posts 60 respectively, hence securing the circuit board 5 into the sensing device. Circuitry for realizing electrical function of the sensing device is: printed and integrated into the top and bottom surfaces of the circuit board 5. The sensor 4 is also welded onto the bottom surface of the circuit board 5. Accordingly the sensor 4 is disposed just between the circuit board 5 and the supporting platform 31 of the sealable venting member 3. In addition, the sensor 4 and the supporting platform 31 are secured firmly with each other under the action of the three screws 61, thus making sure that no gas will escape out of the sensing portion of the sensor 4 from the gas nozzle except for the communication hole 30 of the sealable venting member 3. As shown in FIG. 1, a micro-strip line 58 is circumferentially disposed on the outer periphery of the top surface of the circuit board 5. One end of the micro-strip line 58 is connected with the control circuit, while the other end thereof is extended to one of the through holes 50. As such, when a screw 61 is inserted into the through hole 50, the micro-strip line 58, the screw 61, the threaded post 60 engaged with the above screw 61, the base 1 and the gas nozzle constitute together an antenna construction for transmitting and receiving the signal. The micro-strip line 58 functions to match impedance and extend the length of the antenna constructed of the above screw 61, threaded post 60, base 1 and gas nozzle. The existence of the micro-strip line 58 enhances the capability of signal transmission of the antenna constructed of the above-mentioned components. This ensures that the signal generated after detection of the sensor 4 can be transmitted into free space through said antenna construction under the control of the control circuit. By this manner, the above signal can be steadily and reliably transferred to a monitor unit of the tire pressure system so as to be further processed.

Referring to FIGS. 1 and 2, the button battery 7 is placed on the top surface of the circuit board 5. The battery pressing tab 71 is positioned on the top portion (positive electrode) of the battery 7. The battery pressing tab 71 along with a negative electrode connection portion printed on the top portion of the circuit board 5 are the components of the control circuit. By the connection function of the pressing tab 71 and the negative electrode connection portion with the both electrodes of the button battery 7, the battery 7 supplies power to the entire control circuit. Being supplied with power of the battery 7, the sensor 4 is able to work normally.

Reference is made again to FIGS. 1 and 2. The outer suite 9, which forms together with the inner suite 2 the packaging suite, is of an inverted conical shape. In the outer suit 9 the thread 92 is defined to engage with the thread 21 of the inner suite 2. A plurality of screw holes 90 is defined circumferentially on the bottom portion of the outer suite 9. These screw holes 90 pass radially through the outer suite 9. A plurality of screws 91 pass through these screw holes 90 respectively such that the end surface of each screw 91 is pressed against the bottom surface of the inner suite 2. As a result, once the outer suite 9 and inner suite 2 are assembled with each other, the interior construction of the packaging suite will not be damaged by simply rotating the outer suite 9 unless the screws 91 are removed, thus the entire sensing device being protected effectively.

With reference to above respective figures, the assembling procedure of the external tire pressure sensing device of the invention is described as follows.

At first, the threaded posts 60 are located inside corresponding holes of the circular platform 15 of the base 1. After that, the inner suite 2 is sleeved on the base 1 and threaded posts 60. Next, the communication portion 33 of the sealable venting member 3 is placed into the screw hole 10 of the base 1 such that the circular notch 320 of the member 3 is locked with the stepped ring 150 of the circular platform 15 of the base 1. At this time, the supporting platform 31 of the sealable venting member 3 is tightly positioned inside the frame 28 of the inner suite 2 such that the base 1, threaded posts 60, inner suite 2 and venting member 3 are secured strongly.

Then, the sensor 4, which is disposed on the bottom surface of the circuit board 5, is mounted such that the sensing portion of the sensor 4 engages with the communicating hole 30 of the sealable venting member 3. At locations corresponding to respective through holes 50 of the circuit board 5 and threaded posts 60, a number of screws 61 pass through the through holes 50 defined in the circuit board 5 and then are locked with respective threaded posts 60. One of the screws 61 is connected with the micro-strip line 58 which connects with both of the control circuit and the antenna.

Next, the button battery 7 is mounted on the top surface of the circuit board 5. On the top portion of the battery 7, the battery pressing tab 71 electrically connected with the control circuit is disposed, thus finishing the entire assembling process.

Finally, the rubber ring 8 is sleeved on the circular groove 20 formed on the bottom portion of the screw 21 defined on the outer wall of the inner suite 21. Then, the outer suite 9 is locked with the inner suite 2 by means of a screw 91 which passes through and engages with the screw hole 90 defined on the bottom portion of the outer suite 9.

As such, the whole assembling process of the sensing device is finished. As described above, to enhance the connection between the sensing device and gas nozzle and when the extension cylinder 17 of the base 1 receives the gas nozzle therein, two screws 11 are threaded into radial screw holes 170 of the extension cylinder 17 respectively, thus making the gas nozzle secured into the extension cylinder 17 by said pair of screws 11 and making the entire construction more stable.

Figure 8:
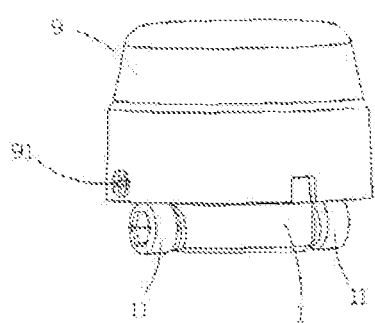
FIG. 8 shows an assembled perspective view of an external tire pressure sensing device according to a preferred embodiment of the present invention.

The finally assembled external tire pressure sensing device of the invention is illustrated in FIG. 8. It can be seen that the entire device is compact and has a greatest diametrical dimension of 2.32 cm. The axial distance between the bottom surface of the circular platform of the base and outer suite 9 is no more than 1.1 cm. Accordingly, the axial dimension of the entire packaging suite is also small. It is well known that for a conventional vehicle, the distance between the gas nozzle of a tire and the outermost side of the tire is often larger than 2.5 cm. Apparently, the tire pressure sending device of the invention has superior adaptability to most kinds of automobiles.

In a summary, the external tire pressure sensing device of the invention has the advantages of compact size, stable construction, high adaptability, good sealability and enhanced reliability.

Person of ordinary skill in the art should know that the signal generated by the sensor of the invention may include but is not limited to pressure signal. For example, the signal may be temperature signal. Generally, the signal generated by electrical detection function of the sensor and to be transmitted may be transmitted via the antenna construction of the invention. These signals to be transmitted belong to the signal generated by the sensor of the invention.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. An external tire pressure sensing device comprising from bottom to top along its axial direction a base, a sensor for detection of the internal pressure of tire, a circuit board for incorporating a control circuit therein, a button battery and a packaging suite used for package purpose, wherein
the base includes a screw hole along its axial direction for locking with a gas nozzle, and a circular platform is formed on a top portion of the base;
the device comprises an integral sealable venting member having a supporting platform tightly engaged with the circular platform, a communication portion placed into the base screw hole from the bottom of the supporting platform to push out a gas outlet valve of the gas nozzle, and a communicating hole for communicating the screw hole with an upper space of the supporting platform;
the sensor is installed on the bottom surface of the circuit board so as to be electrically connected with a control circuit of the circuit board; and a sensing portion located on a bottom surface of the sensor is engaged tightly with the communicating hole of the sealable venting member;
the button battery is positioned on a top surface of the circuit board and electrically connected with the control circuit so as to provide electrical power;
the control circuit is used to transmit via an antenna the signal generated by the sensor during detection process;
the packaging suite includes an inner suite sleeved on the periphery of the base and an outer suite which cooperates with the inner suite so as to pack the entire device.

2. The external tire pressure sensing device according to claim 1, wherein the inner suite is provided with a frame disposed on a top surface of the circular platform of the base, the frame surrounding the periphery of the supporting platform of the sealable venting member.

3. The external tire pressure sensing device according to claim 1, wherein a plurality of threaded posts is provided on the circular platform of the base; and a plurality of screws passes through corresponding through holes predefined in the circuit board and then is locked with corresponding threaded post.

4. The external tire pressure sensing device according to claim 3, wherein the antenna includes one of the screws, a threaded post engaged with the above screw, a base secured with the screw post, and a gas nozzle contacting with the base.

5. The external tire pressure sensing device according to claim 4, wherein a micro-strip line is arranged on the circuit board and connected with both of the control circuit and antenna.

6. The external tire pressure sensing device according to claim 1, wherein a stepped ring is provided on the circular platform of the base at location corresponding to the screw hole of the base; the inner diameter of the stepped ring is smaller than that of the screw hole; a circular notch is defined between the communication portion of the sealable venting member and supporting platform; and the stepped ring is disposed into the circular notch so as to securely connect the sealable venting member and base.

7. The external tire pressure sensing device according to claim 1, wherein a circular groove is defined in an outer wall of the inner suite; a rubber ring is received inside the circular groove; and the outer suite and inner suite are secured with each other and engaged with each other through the rubber ring.

8. The external tire pressure sensing device according to claim 1, wherein a plurality of radial screw holes is defined in a bottom portion of the outer suite; corresponding number of screws pass radially through respective screw holes; and an end surface of each screw is pressed against the bottom surface of the inner suite.

9. The external tire pressure sensing device according to claim 1, wherein an extension cylinder is provided on the bottom portion of the base; a plurality of radial screw holes is defined in a circumferential wall of the extension cylinder; and corresponding number of screws pass through respective radial screw holes and then are locked with a circumferential wall of the gas nozzle.

10. The eternal tire pressure sensing device according to claim 1, wherein the outer diameter of the outer suite is no more than 2.32 cm; and the axial height from the circular platform of the base to the outer suite is no more than 1.1 cm.

11. The external tire pressure sensing device according to claim 1, wherein the outer suite is of a conical shape.

\* \* \* \* \*